(12) United States Patent
Xu

(10) Patent No.: US 12,217,545 B2
(45) Date of Patent: Feb. 4, 2025

(54) MULTIPLE PERSPECTIVE HAND TRACKING

(71) Applicant: INNOPEAK TECHNOLOGY, INC., Palo Alto, CA (US)

(72) Inventor: Yi Xu, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 0 days.

(21) Appl. No.: 18/574,717

(22) PCT Filed: Jun. 29, 2021

(86) PCT No.: PCT/US2021/039678
§ 371 (c)(1),
(2) Date: Dec. 27, 2023

(87) PCT Pub. No.: WO2023/277888
PCT Pub. Date: Jan. 5, 2023

(65) Prior Publication Data
US 2024/0296697 A1    Sep. 5, 2024

(51) Int. Cl.
*G06V 40/20* (2022.01)
*G06F 3/01* (2006.01)
(Continued)

(52) U.S. Cl.
CPC .............. *G06V 40/28* (2022.01); *G06F 3/017* (2013.01); *G06V 10/12* (2022.01); *G06V 10/70* (2022.01); *H04N 23/64* (2023.01)

(58) Field of Classification Search
CPC ........ G06F 3/017; G06V 10/12; G06V 10/70; G06V 40/28; H04N 23/64
See application file for complete search history.

(56) References Cited

U.S. PATENT DOCUMENTS

| 9,019,201 B2 * | 4/2015 | Holmdahl | G06F 3/017 |
| | | | 382/103 |
| 2012/0130822 A1 * | 5/2012 | Patwa | G06Q 30/0273 |
| | | | 705/14.69 |

(Continued)

OTHER PUBLICATIONS

Zimmermann and T. Brox, "Learning to Estimate 3D Hand Pose from Single RGB Images", ICCV 2017, (1arXiv:1705.01389v3 [cs.CV] Oct. 15, 2017 ).

(Continued)

*Primary Examiner* — Dmitriy Bolotin
(74) *Attorney, Agent, or Firm* — Ladas & Parry, LLP

(57) ABSTRACT

This application is directed to identifying user gestures. One or more first images are captured by a first camera and include a first perspective of a hand. A first hand gesture is identified from the one or more first images. A second hand gesture is identified from one or more second images that are captured by a second camera, e.g., substantially concurrently with the one or more first images. The one or more second images include a second perspective of the hand that is distinct from the first perspective. A final hand gesture of the hand is determined based on the first and second hand gestures and applied to enable an operation on an object. The first and second cameras are included in two distinct electronic devices. The operation is performed by one of the two electronic devices or by a third electronic device distinct from the two electronic devices.

19 Claims, 12 Drawing Sheets

(51) Int. Cl.
*G06V 10/12* (2022.01)
*G06V 10/70* (2022.01)
*H04N 23/60* (2023.01)

(56) References Cited

U.S. PATENT DOCUMENTS

| | | |
|---|---|---|
| 2013/0229508 A1* | 9/2013 | Li .................... G06F 1/3287 |
| | | 348/77 |
| 2018/0108180 A1 | 4/2018 | Fei et al. |
| 2018/0120950 A1 | 5/2018 | Karmon et al. |
| 2019/0096220 A1* | 3/2019 | Anderholm ........ G08B 21/0476 |
| 2019/0101991 A1* | 4/2019 | Brennan ................ G06V 40/28 |
| 2019/0138107 A1 | 5/2019 | Nietfeld et al. |
| 2021/0124917 A1* | 4/2021 | Wang ...................... G06T 17/00 |
| 2021/0201661 A1* | 7/2021 | Al Jazaery ............. G08C 23/00 |
| 2024/0249379 A1* | 7/2024 | Khoe ..................... H04N 23/62 |

OTHER PUBLICATIONS

International Search Report, International Application No. PCT/US2021/039678, mailed Oct. 4, 2021 (10 pages).
Written Opinion of the International Searching Authority in International Application No. PCT/US2021/039678 mailed Oct. 4, 2021.

* cited by examiner

800
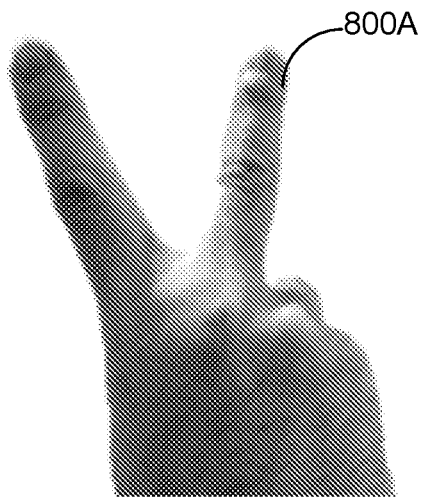
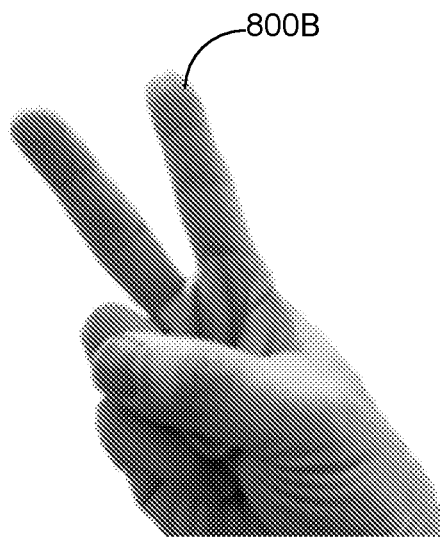
Figure 8A
Figure 8B
900
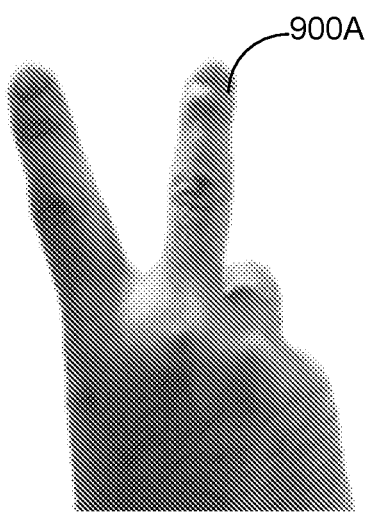
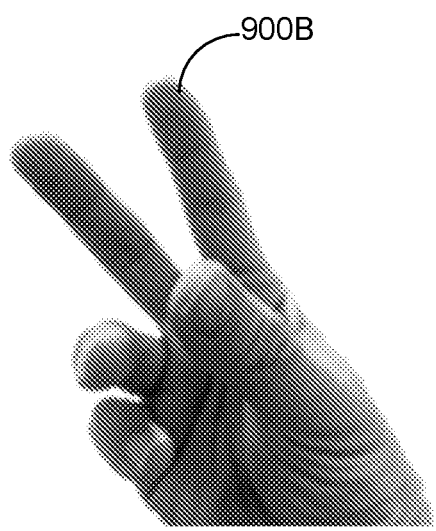
Figure 9A
Figure 9B

| | Gesture | Confidence Score | Weight |
|---|---|---|---|
| Camera 1 1106A | Gesture 800 | 0.95 | 0.1 |
| Camera 2 1106B | Gesture 900 | 0.85 | 0.8 |
| Camera 3 1106D | Gesture 800 | 0.7 | 0.4 |
| Camera 4 1106D | Gesture 900 | 0.4 | 0.3 |
| Camera 5 1106E | Gesture 800 | 0.1 | 0.7 |

```
Obtain one or more first images that are captured by a first camera, the one or
more first images including a first perspective of a hand 1202
                                    ↓
Identify a first hand gesture from the one or more first images 1204
                                    ↓
Obtain a second hand gesture 1206

The second hand gesture is identified from one or more second images that
    are captured by a second camera and substantially concurrently with the
    one or more first images, the one or more second images including a
    second perspective of the hand 1208

The second perspective distinct from the first perspective 1210
                                    ↓
Determine a final hand gesture of the hand based on the first and second hand
gestures 1212
                                    ↓
Enable a predefined operation on an object according to the final hand gesture
1214
```

Figure 12

MULTIPLE PERSPECTIVE HAND TRACKING

CROSS-REFERENCE TO RELATED APPLICATIONS

This application is a 35 U.S.C. 371 National Phase application of PCT Patent Application No.PCT/US2021/039678 filed Jun. 29, 2021, the content of which is herein incorporated by reference in its entirety.

TECHNICAL FIELD

This application relates generally to gesture recognition including, but not limited to, methods, systems, and non-transitory computer-readable media for recognizing air gestures and implementing gesture control on user interfaces of an electronic device.

BACKGROUND

Gesture control is an important component of user interface on modern day electronic devices. For devices with touch screens, touch gestures are used for invoking various user interface functions. Common touch gestures include tap, double tap, swipe, pinch, zoom, rotate, etc. Each touch gesture is typically associated with a certain user interface function. For example, the swipe gesture is often used to scroll up and down a web page and to switch between photos within a photo album application. In contrast, touchless air gestures are used to implement certain user interface functions for electronic devices having no touch screens, e.g., head-mounted displays (e.g., virtual reality headsets, augmented reality glasses, mixed reality headsets). These devices have no touch screens, and however, can include front-facing cameras or miniature radars to track human hands in real time. For example, some head mounted displays have implemented hand tracking functions to complete user interaction including selecting, clicking, and typing on a virtual keyboard. Air gestures can also be used on the devices with touch screens when a user's hands are not available to touch the screen (e.g., while preparing a meal, the user can use air gestures to scroll down a recipe so that the user does not need to touch the device screen with wet hands). It would be beneficial to have an efficient and accurate air gesture recognition mechanism, particularly when air gestures cannot be clearly discerned from a viewing angle of an electronic device or when the electronic device does not have a camera.

SUMMARY

Specifically, in one aspect, a method is implemented to identify user gestures. The method includes obtaining one or more first images that are captured by a first camera. The one or more first images include a first perspective (i.e., viewing angle) of a hand and identifying a first hand gesture from the one or more first images. The method further includes obtaining a second hand gesture. The second hand gesture is identified from one or more second images that are captured by a second camera, e.g., substantially concurrently with the one or more first images. The one or more second images include a second perspective of the hand, and the second perspective is distinct from the first perspective. The method further includes determining a final hand gesture of the hand based on the first and second hand gestures and enabling a predefined operation on an object according to the final hand gesture.

In another aspect, some implementations include an electronic system including one or more processors and memory having instructions stored thereon, which when executed by the one or more processors cause the processors to perform any of the above methods.

In yet another aspect, some implementations include a non-transitory computer-readable medium, having instructions stored thereon, which when executed by one or more processors cause the processors to perform any of the above methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIGS. 8A and 8B illustrate two different perspectives of an example hand gesture, in accordance with some embodiments.

FIGS. 9A and 9B illustrate two different perspectives of another example hand gesture, in accordance with some embodiments.

FIG. 11 is a table showing confidence scores of hand gestures identified from images captured by different cameras from different perspectives, in accordance with some embodiments.

FIG. 12 is a flow diagrams of an example method of identifying user gestures from a plurality of perspectives, in accordance with some embodiments.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1A:
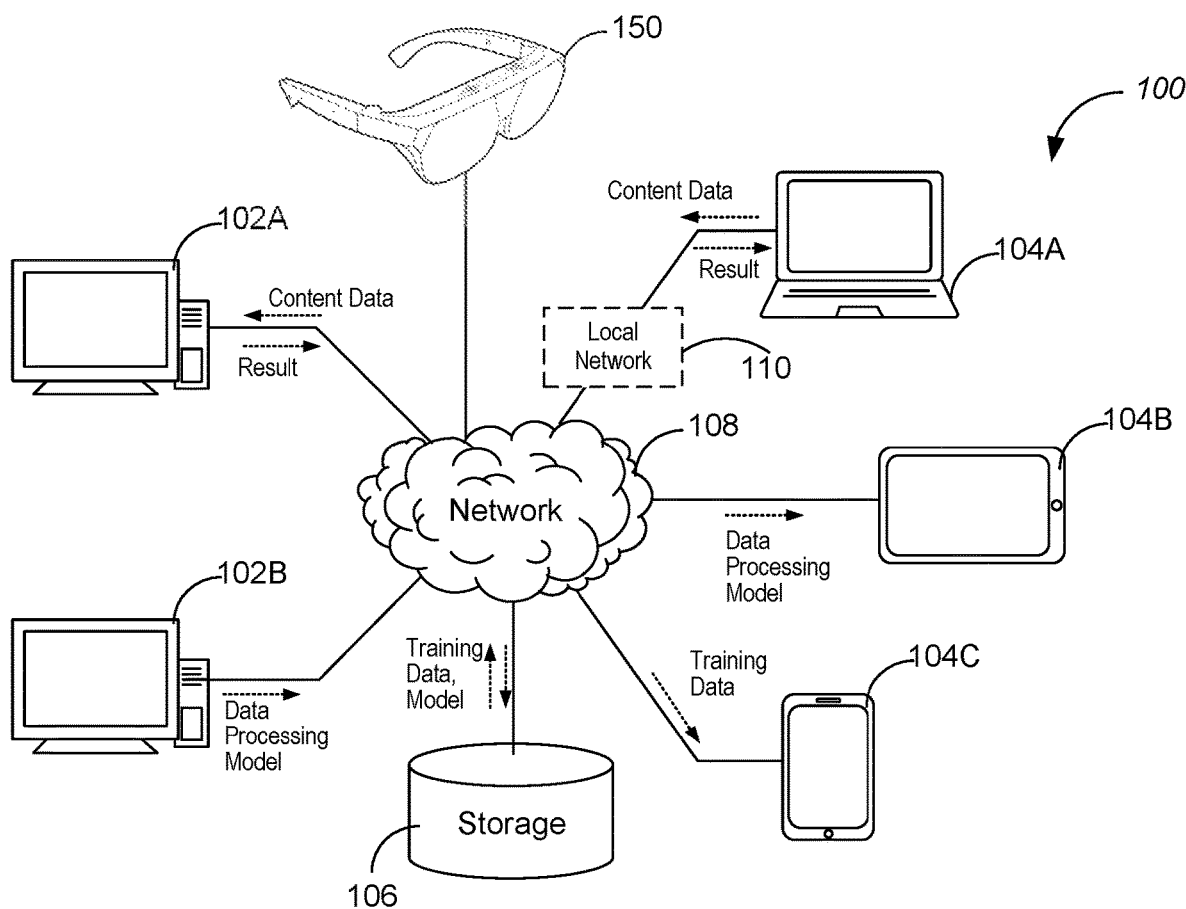
FIG. 1A is an example data processing environment having one or more servers communicatively coupled to one or more client devices, in accordance with some embodiments.

FIG. 1A is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, augmented reality (AR) glasses 150, or intelligent, multi-sensing, network-connected home devices (e.g., a camera). Each client device 104 can collect data or user inputs, executes user applications, and present outputs on its user interface. The collected data or user inputs can be processed locally at the client device 104 and/or remotely by the server(s) 102. The one or more servers 102 provides system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. Further, in some embodiments, the one or more servers 102 can implement data processing tasks that cannot be or are preferably not completed locally by the client devices 104. For example, the client devices 104 include a game console that executes an interactive online gaming application. The game console receives a user instruction and sends it to a game server 102 with user data. The game server 102 generates a stream of video data based on the user instruction and user data and provides the stream of video data for display on the game console and other client devices that are engaged in the same game session with the game console. In another example, the client devices 104 include a networked surveillance camera and a mobile phone 104C. The networked surveillance camera collects video data and streams the video data to a surveillance camera server 102 in real time. While the video data is optionally pre-processed on the surveillance camera, the surveillance camera server 102 processes the video data to identify motion or audio events in the video data and share information of these events with the mobile phone 104C, thereby allowing a user of the mobile phone 104C to monitor the events occurring near the networked surveillance camera in real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

Deep learning techniques are applied in the data processing environment 100 to process content data (e.g., video, image, audio, or textual data) obtained by an application executed at a client device 104 to identify information contained in the content data, match the content data with other data, categorize the content data, or synthesize related content data. In these deep learning techniques, data processing models are created based on one or more neural networks to process the content data. These data processing models are trained with training data before they are applied to process the content data. In some embodiments, both model training and data processing are implemented locally at each individual client device 104 (e.g., the client device 104C). The client device 104C obtains the training data from the one or more servers 102 or storage 106 and applies the training data to train the data processing models. Subsequently to model training, the client device 104C obtains the content data (e.g., captures video data via an internal camera) and processes the content data using the training data processing models locally. Alternatively, in some embodiments, both model training and data processing are implemented remotely at a server 102 (e.g., the server 102A) associated with a client device 104 (e.g. the client device 104A). The server 102A obtains the training data from itself, another server 102 or the storage 106 and applies the training data to train the data processing models. The client device 104A obtains the content data, sends the content data to the server 102A (e.g., in an application) for data processing using the trained data processing models, receives data processing results from the server 102A, and presents the results on a user interface (e.g., associated with the application). The client device 104A itself implements no or little data processing on the content data prior to sending them to the server 102A. Additionally, in some embodiments, data processing is implemented locally at a client device 104 (e.g., the client device 104B), while model training is implemented remotely at a server 102 (e.g., the server 102B) associated with the client device 104B. The server 102B obtains the training data from itself, another server 102 or the storage 106 and applies the training data to train the data processing models. The trained data processing models are optionally stored in the server 102B or storage 106. The client device 104B imports the trained data processing models from the server 102B or storage 106, processes the content data using the data processing models, and generates data processing results to be presented on a user interface locally.

Figure 1B:
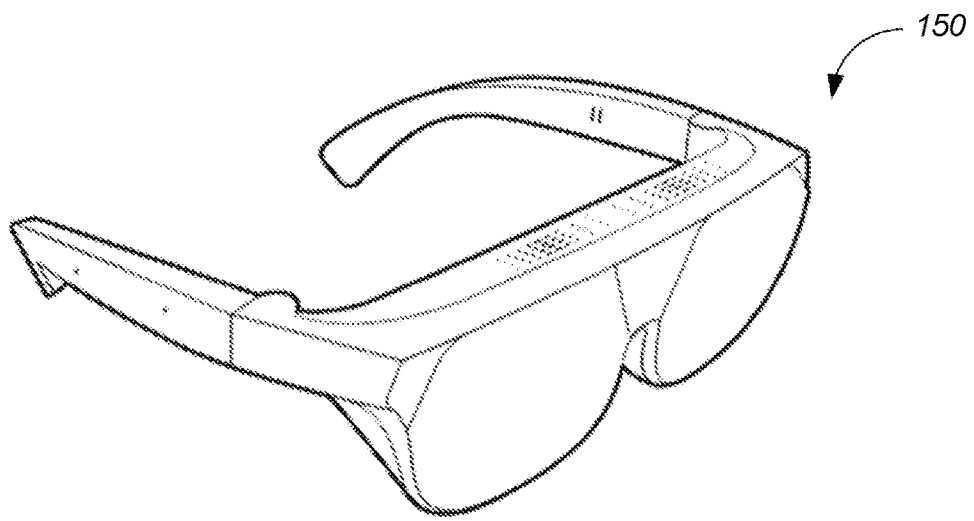
FIG. 1B is a pair of AR glasses that can be communicatively coupled in a data processing environment, in accordance with some embodiments.

FIG. 1B illustrates a pair of AR glasses 150 (also called a head-mounted display (HMD)) that can be communicatively coupled in a data processing environment 100, in accordance with some embodiments. The AR glasses 150 includes a camera, a microphone, a speaker and a display. The camera and microphone are configured to capture video and audio data from a scene of the AR glasses 150. In some situations, the camera captures images including hand gestures of a user wearing the AR glasses 150. In some situations, the microphone records ambient sound, including user's voice commands. The video or audio data captured by the camera or microphone is processed by the AR glasses 150, server(s) 102, or both to recognize the hand gestures and related user instructions. Optionally, deep learning techniques are applied by the server(s) 102, AR glasses 150 or both to recognize the hand gestures and user instructions. The user instructions are used to control the AR glasses 150 itself or interact with an application (e.g., a gaming application) executed by the AR glasses 150. In some embodiments, the display of the AR glasses 150 displays a user interface, and the recognized user instructions are used to interact with user selectable display items on the user interface, thereby enabling performing predefined operations on objections of the application executed by the AR glasses 150.

Figure 2:
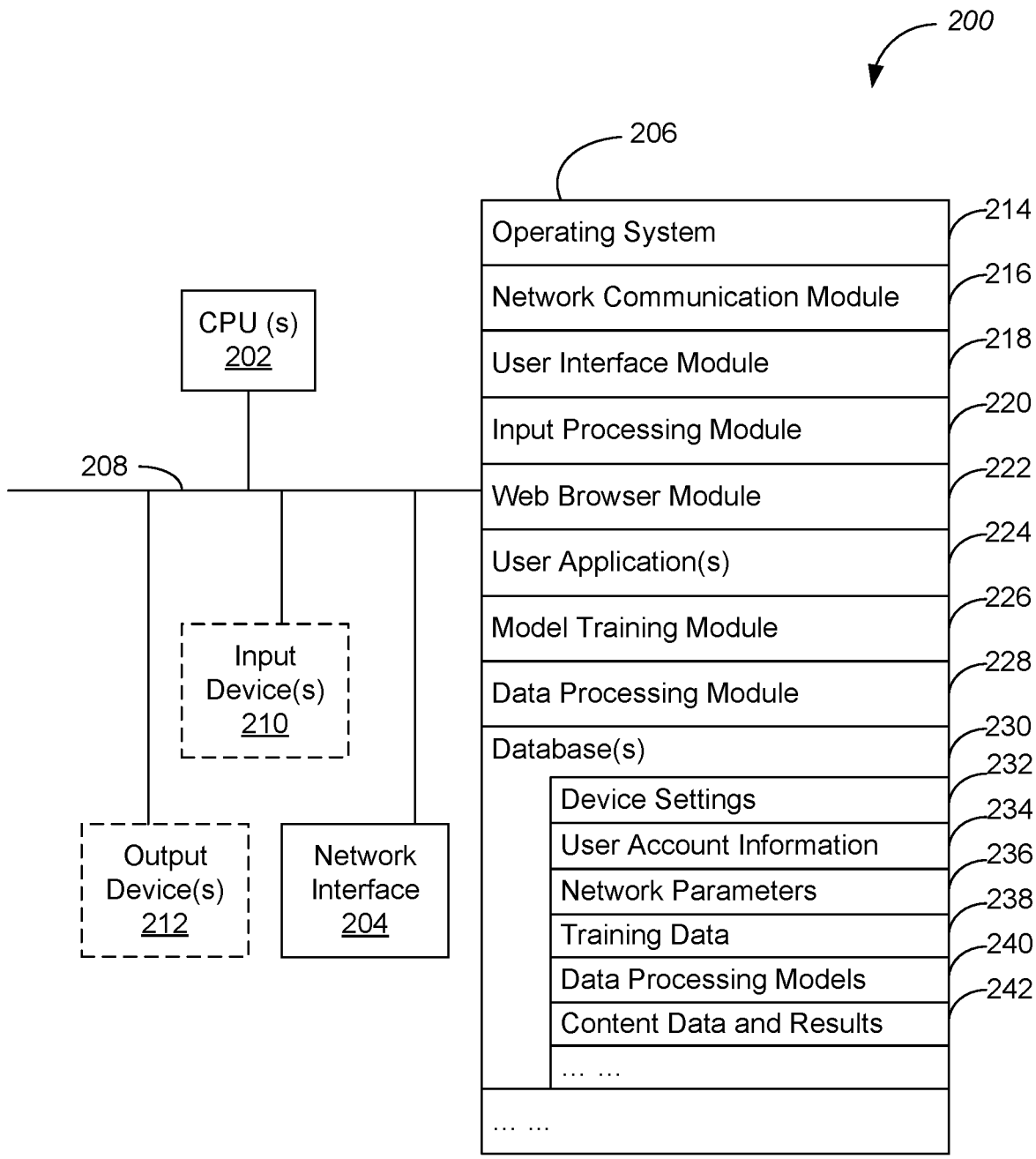
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104 (e.g., AR glasses 150 in FIG. 1B), a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 224 for execution by the data processing system 200 (e.g., games, social network applications, smart home applications, and/or other web or non-web based applications for controlling another electronic device and reviewing data captured by such devices);
- Model training module 226 for receiving training data and establishing a data processing model for processing content data (e.g., video, image, audio, or textual data) to be collected or obtained by a client device 104;
- Data processing module 228 for processing content data using data processing models 240, thereby identifying information contained in the content data, matching the content data with other data, categorizing the content data, or synthesizing related content data, where in some embodiments, the data processing module 228 is associated with one of the user applications 224, and configured to recognize hand gestures from image or video data and enable predefined operations on objects in association with the user application 224;
- One or more databases 230 for storing at least data including one or more of:
  - Device settings 232 including common device settings (e.g., service tier, device model, storage capacity, processing capabilities, communication capabilities, etc.) of the one or more servers 102 or client devices 104;

User account information 234 for the one or more user applications 224, e.g., user names, security questions, account history data, user preferences, and predefined account settings;

Network parameters 236 for the one or more communication networks 108, e.g., IP address, subnet mask, default gateway, DNS server and host name;

Training data 238 for training one or more data processing models 240;

Data processing model(s) 240 for processing content data (e.g., video, image, audio, or textual data) using deep learning techniques; and Content data and results 242 that are obtained by and outputted to the client device 104 of the data processing system 200, respectively, where the content data is processed by the data processing models 240 locally at the client device 104 or remotely at the server 102 to provide the associated results 242 to be presented on client device 104.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
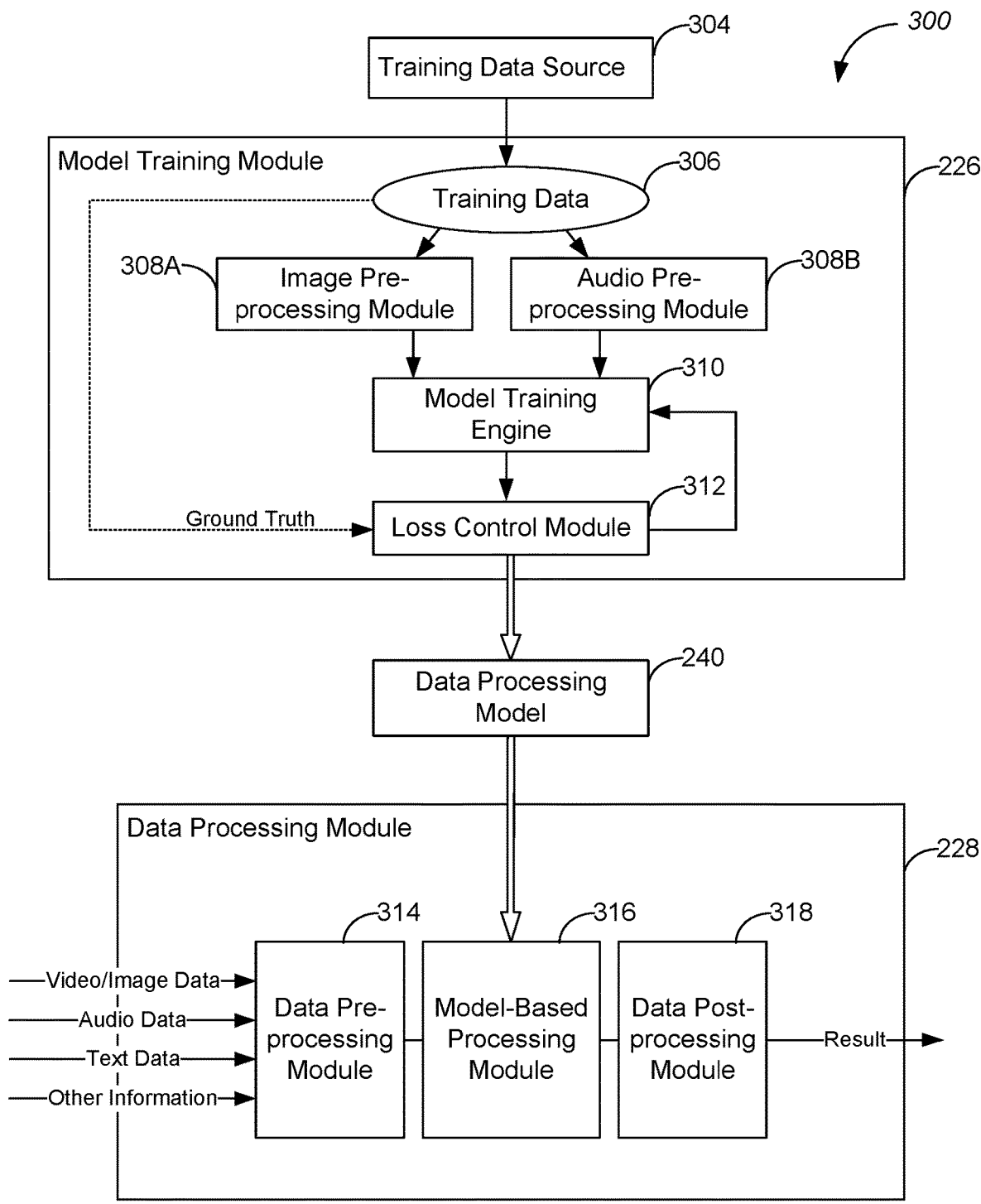
FIG. 3 is an example data processing environment for training and applying a neural network based (NN-based) data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing module 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240. In some embodiments, the processed content data is further processed by the data post-processing module 318 to present the processed content data in a preferred format or to provide other related information that can be derived from the processed content data.

Figure 4A:
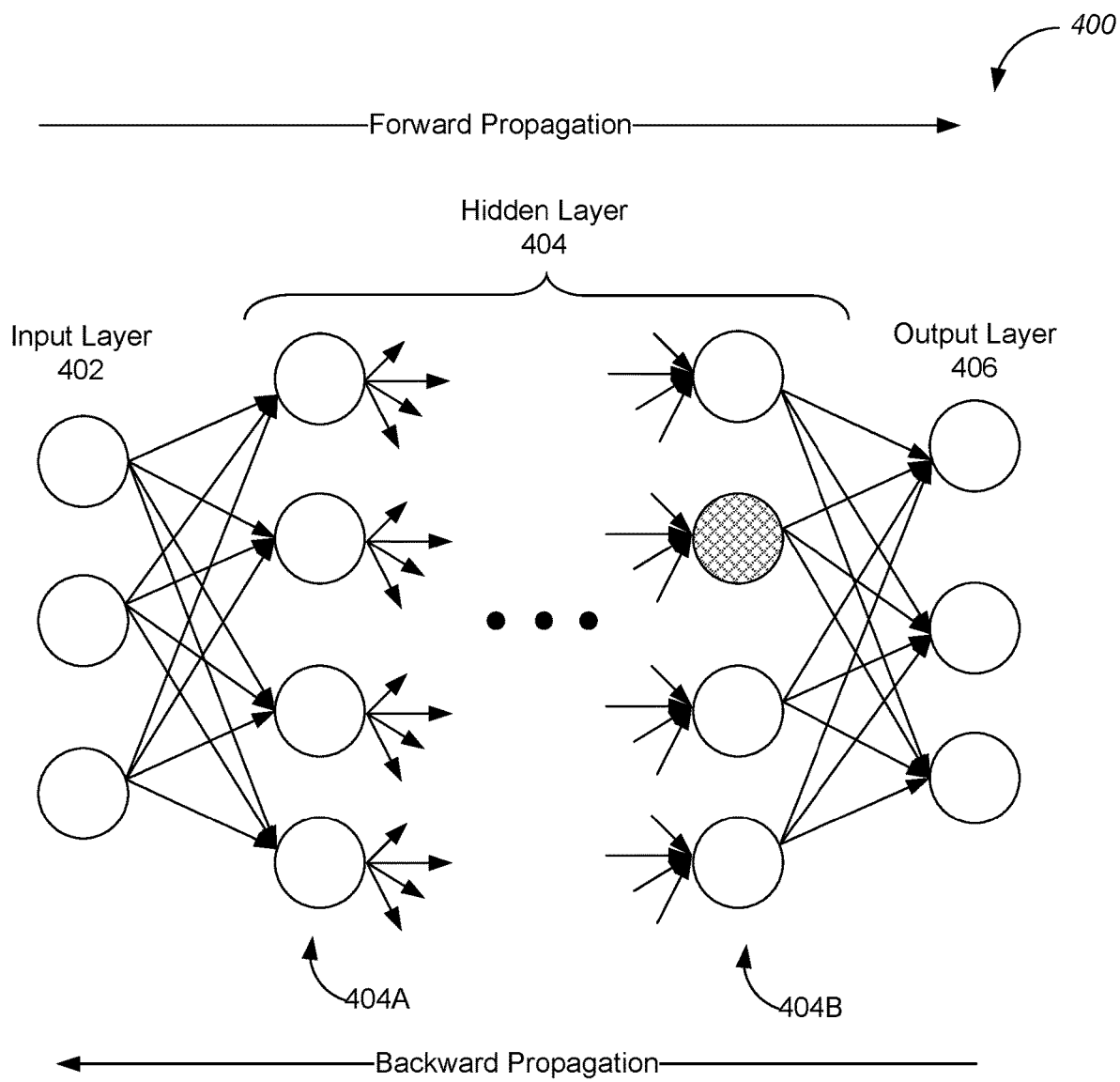
FIG. 4A is an example neural network (NN) applied to process content data in an NN-based data processing model, in accordance with some embodiments.
Figure 4B:
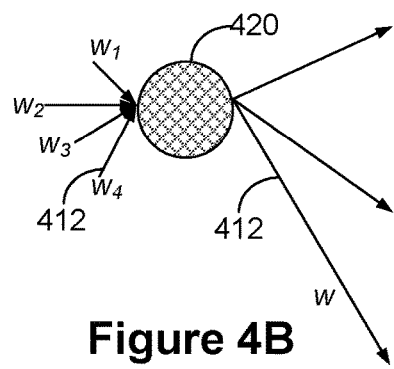
FIG. 4B is an example node in the neural network (NN), in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. For example, the NN 400 is applied in the NN-based data processing model 240 to process image or video data and determine hand gestures accordingly. In this application, each node 420 of the NN 400 corresponds to a filter. "Channel", "filter", "neuron", and "node" are used in an exchangeable manner in the context of applying the NN 400. The data processing model 240 is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w' associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

Figure 5:
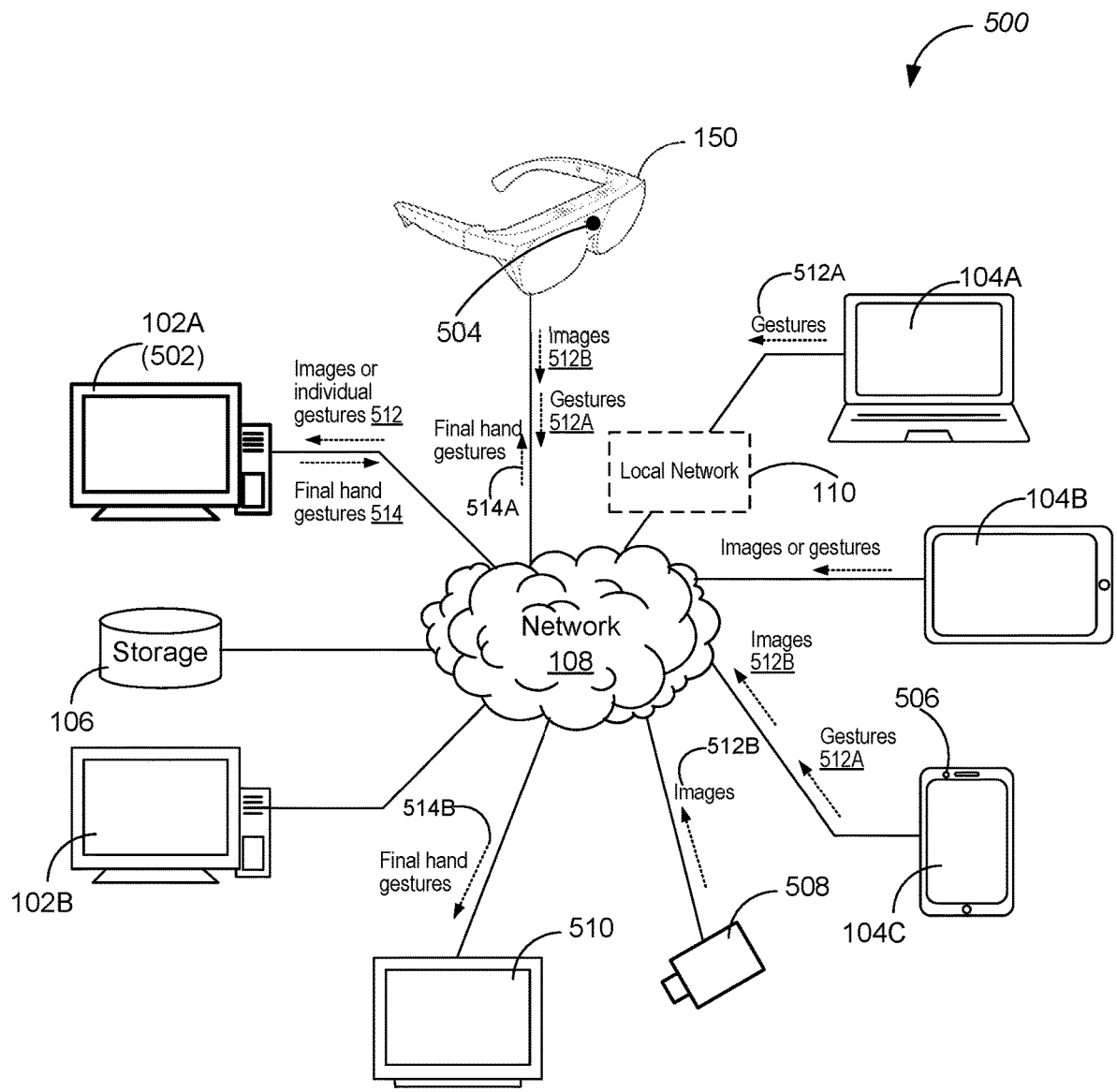
FIG. 5 is an example centralized environment that determines hand gestures in a remote hub device (e.g., a server), in accordance with some embodiments.

FIG. 5 is an example centralized environment 500 that determines hand gestures in a remote hub device 502 (e.g., a server 102), in accordance with some embodiments. In the centralized environment 500, the remote hub device 502 is distinct from each of a plurality of electronic devices, and communicatively coupled to each of a plurality of electronic devices at least partially via one or more wide area networks (WANs). The plurality of electronic devices includes a first electronic device (e.g., the HMD 150) and a second electronic device (e.g., a client device 104C). The first electronic device has a first camera 504, and the second electronic device has a second camera 506. Examples of these electronic devices having cameras include, but are not limited to, the client devices 104A-104C, an HMD 150, a networked surveillance camera 508, and a smart television (TV) device 510 having a camera. The first camera 504 captures one or more first images including a first perspective (i.e., a first viewing angle) of a hand. The second camera 506 captures one or more second images including a second perspective (i.e., a second viewing angle) of the hand, concurrently with the first camera 504 capturing the one or more first images. The second perspective is distinct from the first perspective. Stated another way, the first and second images are captured from the first and second viewing angles of the hand, respectively. In some embodiments, the first and second images are captured concurrently when the first and second images are captured within a time window having a predefined width, e.g., within 1 second, such that the first and second images correspond to the same hand gesture.

In some embodiments, the first electronic device identifies a first hand gesture from the one or more first images captured by the first camera 504 locally, and the second electronic device identifies a second hand gesture from the one or more second images captured by the second camera 506 locally. Each of the first and second electronic devices uses a deep learning model to recognize the first or second hand gesture from the first or second image(s), respectively, and the server 102 collects (512A) the first and second hand gestures from the first and second electronic devices via the one or more communication networks 108. Alternatively, in some embodiments, one or both of the first and second electronic devices have limited computational capabilities. The first image(s), the second image(s) or both of them are transferred (512B) to the server 102 to identify the first hand gesture, the second hand gesture, or both. The server 102 uses a deep learning model to recognize the first or second hand gesture from the first or second image(s), respectively. For example, images captured by the surveillance camera 508 are streamed (512B) to the server 102 that subsequently recognizes hand gestures from the images, e.g., using the deep learning model.

After the server 102 obtains the first and second hand gestures (e.g., by receiving them from the electronic devices or by generating them from the images by itself), the server 102 determines a final hand gesture of the hand from the first and second hand gestures, and enables a predefined operation on an object according to the final hand gesture. In some embodiments, the server 102 enables the first electronic device having the first camera 504 to perform the predefined operation associated with the final hand gesture. The server 102 sends (514A) the final hand gesture or a user instruction associated with the predefined operation to the first electronic device to enable the predefined operation. Alternatively, in some embodiments, the plurality of electronic devices further include a third electronic device distinct from the first and second electronic devices having the first and second cameras 504 and 506. The server 102 enables the third electronic device to perform the predefined operation associated with the final hand gesture. In an example, the third electronic device (e.g., the TV device 510) does not have its own camera, and utilizes cameras of other electronic devices to detect hand gestures that enables associated operations. The server 102 sends (514B) the final hand gesture or the user instruction associated with the predefined operation to the third electronic device to enable the predefined operation. Examples of the final hand gesture include, but are not limited to, a swipe, a tap, and an in-air scribble for text input.

Figure 6:
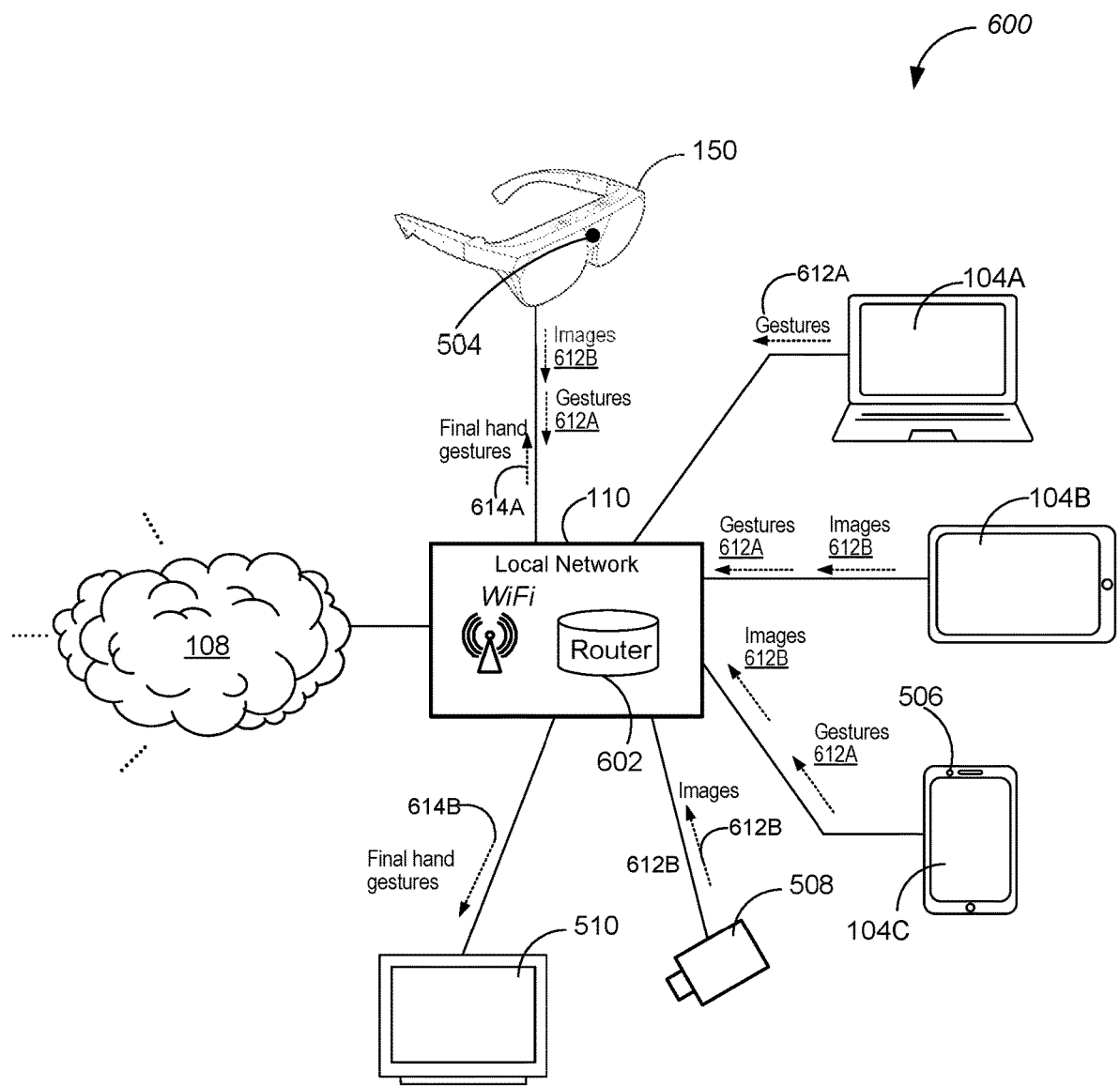
FIG. 6 is an example localized environment that determines hand gestures by a local hub device (e.g., a network router), in accordance with some embodiments.

FIG. 6 is an example localized environment 600 that determines hand gestures by a local hub device 602 (e.g., a network router 110), in accordance with some embodiments. The localized environment 600 has a local hub device 602 that is distinct from each of a plurality of electronic devices. The local hub device 602 enables a local area network (LAN) 110, and is communicatively coupled to each of a plurality of electronic devices via the LAN 110. Examples of the local hub device 602 include, and are not limited to network routers, telephones, network switches, residential gateways (RG), set-top boxes, fixed mobile convergence products, home networking adapters, and Internet access gateways. A first electronic device has a first camera 504, and a second electronic device has a second camera 506. The first camera 504 captures one or more first images including a first perspective (i.e., a first viewing angle) of a hand. The second camera 506 captures one or more second images including a second perspective (i.e., a second viewing angle) of the hand, concurrently with the first camera 504 capturing the one or more first images. The second perspective is distinct from the first perspective. Stated another way, the first and second images are captured from the first and second viewing angles of the hand, respectively. In some embodiments, the first and second images are captured concurrently when the first and second images are captured within a time window having a predefined width (e.g., within 1 second), such that the first and second images correspond to the same hand gesture.

In some embodiments, the first electronic device identifies a first hand gesture from the one or more first images captured by the first camera 504 locally, and the second electronic device identifies a second hand gesture from the one or more second images captured by the second camera 506 locally. The local hub device 602 collects (612A) the first and second hand gestures from the first and second electronic devices via the LAN 110. Alternatively, in some embodiments, the first image(s), the second image(s) or both of them are transferred (612B) to the local hub device 602 to identify the first hand gesture, the second hand gesture, or both. For example, the surveillance camera 508 has limited computational capabilities. Images captured by the surveillance camera 508 are streamed (612B) to the local hub device 602 that subsequently recognizes hand gestures from the images, e.g., using a deep learning model.

After the local hub device 602 obtains the first and second hand gestures (e.g., by receiving them from the electronic devices or by generating them from the received images by itself), the local hub device 602 determines a final hand gesture of the hand from the first and second hand gestures, and enables a predefined operation on an object according to the final hand gesture. In some embodiments, the local hub device 602 enables (614A) the first electronic device having the first camera 504 to perform the predefined operation associated with the final hand gesture. Alternatively, in some embodiments, the local hub device 602 enables (614B) a third electronic device distinct from the first and second electronic devices to perform the predefined operation associated with the final hand gesture. In an example, the third electronic device (e.g., the TV device 510) does not have its own camera, and utilizes cameras of other electronic devices to detect hand gestures that enables associated operations.

Figure 7A:
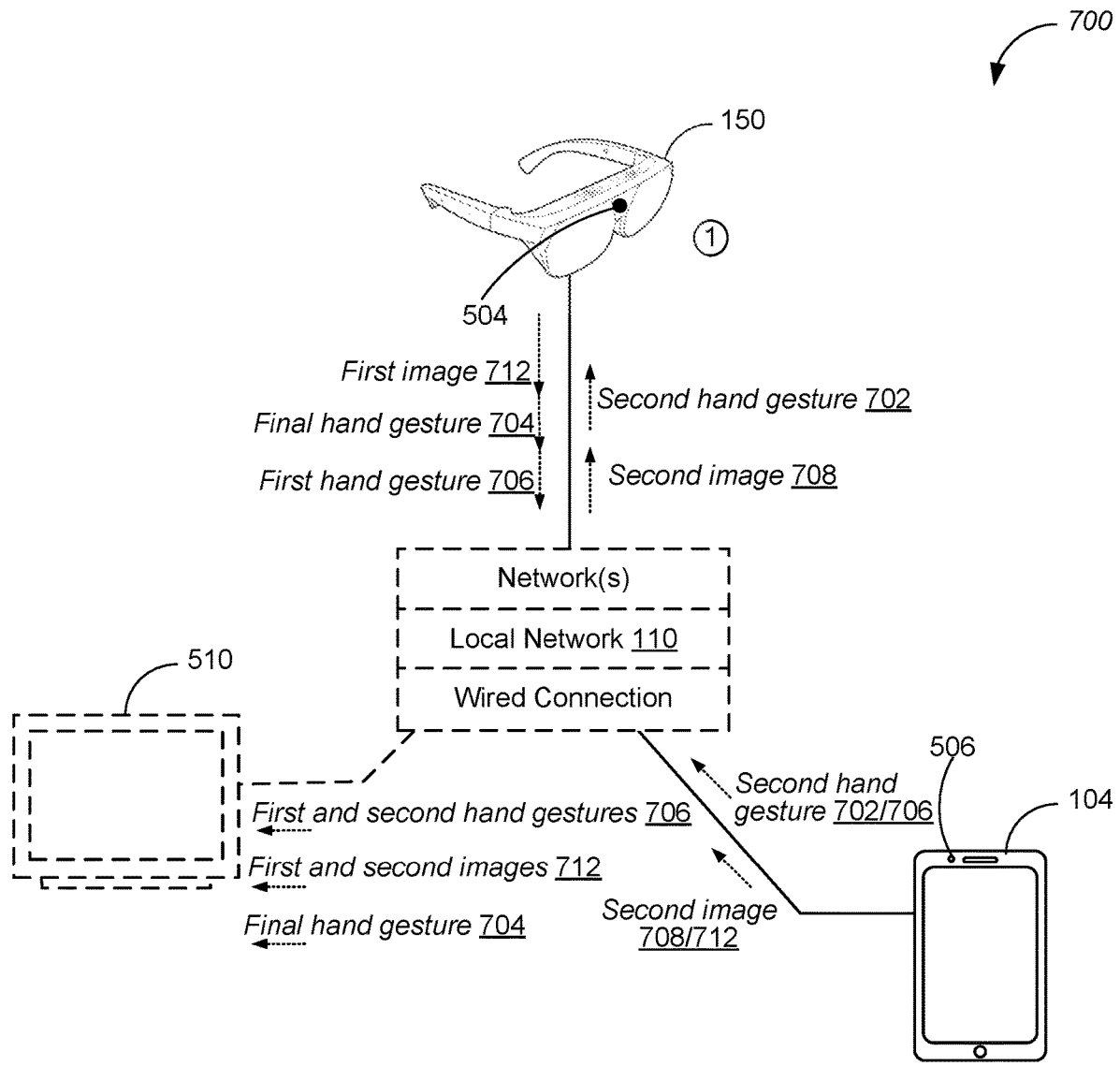
FIG. 7A is an example local electronic system that determines hand gestures using images from a plurality of cameras, in accordance with some embodiments.

FIG. 7A is an example local electronic system 700 that determines hand gestures using images from a plurality of cameras, in accordance with some embodiments. The local electronic system 700 includes an HMD 150, a client device 104, and a TV device 510. The HMD 150 has a first camera 504, and the client device 104 has a second camera 506. The TV device 510 relies on the cameras of the HMD 150 and the client device 104 to capture the images associated with the hand gestures, regardless of whether the TV device 510 has its own camera or not. The HMD 150 obtains one or more first images that are captured by the first camera 504 locally, and the one or more first images includes a first perspective of a hand. The client device 104 captures one or more second images that are captured by the second camera 506 locally and substantially concurrently with the one or more first images (e.g., within one second of the first images). The second images include a second perspective of the hand distinct from the first perspective. That said, the first and second images are captured from the first and second perspectives (i.e., viewing angles) of the hand, respectively. In some embodiments, the HMD 150 identifies a first hand gesture from the one or more first images, and the client device 104 identifies a second hand gesture from the one or more second images. The second hand gesture is provided (702) to the HMD 150. The HMD 150 generates a final hand gesture from the first and second hand gestures, and applies (704) the final hand gesture to control the TV device 510. Alternatively, in some embodiments, the client device 104 obtains the first hand gesture, generates the final hand gesture, and applies the final hand gesture to control the TV device 510. Alternatively and additionally, in some embodiments, after the first and second hand gestures are generated, the first and second hand gestures are provided (706) to the TV device 510 by the HMD 150, client device 104, or both of them. The TV device 510 generates the final hand gesture from the first and second hand gestures and is controlled by the final hand gesture.

In some embodiments, the client device 104 provides (708) the one or more second images (i.e., not the second hand gesture) to the HMD 150, and the HMD 150 determines second hand gesture from the one or more second images. After the HMD 150 obtains the second hand gesture, the HMD 150 determines a final hand gesture of the hand based on the first and second hand gestures. The final hand gesture is sent to (704) and used by a TV device 510 to determine a user action and perform a predefined operation on an object in a user application accordingly. Alternatively, in some embodiments, the client device 104 collects the one or more first images from the HMD 150 and generates the first, second, and final hand gesture. Alternatively and additionally, in some embodiments, the TV device 510 collects the first and second images (712) from the HMD 150 and client device 104, generates the first, second, and final hand gestures, and performs the predefined operation on the object in response to the final hand gesture.

The HMD 150, client device 104, and TV device 510 are communicatively coupled to each other via one or more communication networks 108 that are implemented using any known network protocol, including various wired or wireless protocols. In an example, the HMD 150 is coupled to the client device 104 via a wire, and the TV device 510 is communicatively coupled to each of the client device 104 and the HMD 150 via a respective Bluetooth communication link. In some situations, communication bandwidths among the HMD 150, client device 104, and TV device 510 are sufficient to support large amount of data transfer, and the images are consolidated at one of these three electronic devices having a sufficient computation capability to determine the final hand gesture. In some other situation, the communication bandwidths among the HMD 150, client device 104, and TV device 510 are limited and need to be conserved, and the first and second images are locally processed at the HMD 150 and client device 104, such that only the resulting hand gestures need to be transferred among these three electronic devices.

Figure 7B:
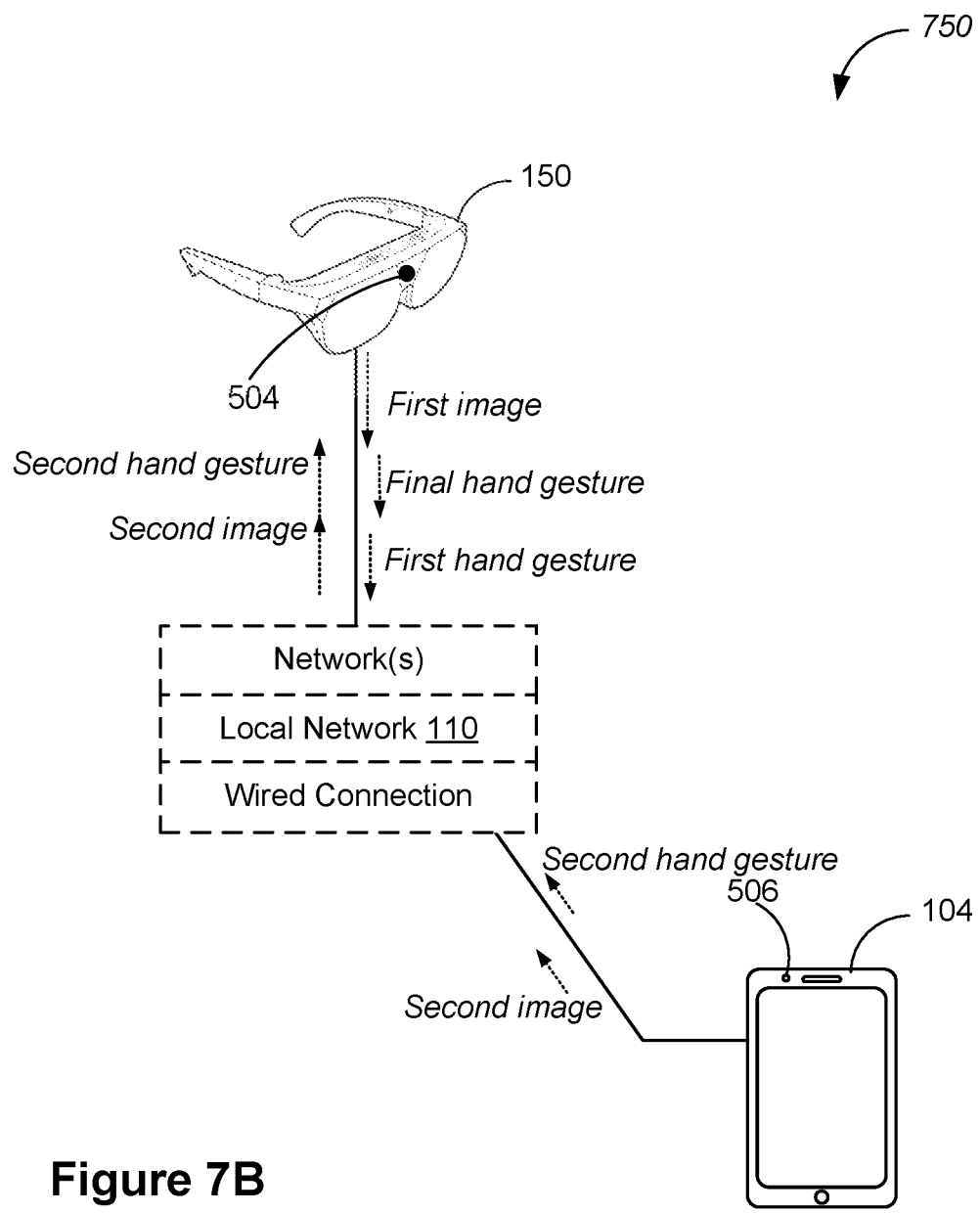
FIG. 7B is an example local electronic system that includes a head-mounted display (HMD) and a mobile device, in accordance with some embodiments.

FIG. 7B is an example local electronic system 750 that includes an HMD 150 and a mobile device 104, in accordance with some embodiments. In some embodiments, the mobile device 104 is coupled to the HMD 150 via one or more communication networks 108 (e.g., a wire, a WAN, a LAN 110, a combination of the WAN and LAN). The mobile device 104 is fixed in a scene or held by hand while the HMD 150 is worn by a user. Alternatively, in some embodiments, the mobile device 104 is connected to the HMD 150 via a wire, and the user may hold the mobile device 104 by hand while wearing the HMD 150. A first camera is mounted on the HMD 150, and a second camera is integrated in the mobile device 104. Both of the first and second cameras are enabled to capture images that track movement of the same hand separately and from two different perspectives (i.e., viewing angles). In some embodiments, the user is prompted to adjust a position or an orientation of the mobile device 104 to capture images that can provide a better viewing angle of the hand. Such images enhance an accuracy level for recognizing hand poses and gestures compared with the images captured by the single first camera fixed on the HMD 150.

In some embodiments, the HMD 150 can be Augmented Reality (AR) glasses, Virtual Reality (VR) headset, or smart glasses without full 3D display. In some embodiments, the mobile device 104 is a mobile phone, a tablet computer, a laptop computer, a desktop computer, a surveillance camera, a cloud-based server, or a networked device having a camera. The HMD 150 is coupled to the mobile device via a universal standard bus (USB) cable, or wirelessly via Wi-Fi, Bluetooth or Internet. In an example, AR glasses works in tandem with a mobile phone and implements a multi-modal interaction paradigm. The mobile phone is used as an input device for user interaction with objects displayed in the AR glasses. A user uses the mobile phone as a pointing device and use a touchscreen of the mobile phone for various input tasks (e.g., swipe, button click, text input, etc.). Alternatively, hand gesture estimation is directly used for user interaction. The electronic system 750 uses a hand gesture estimation output to recognize an air gesture and perform predefined operations (e.g., launching an application, exiting from an application, dismissing a message) based on the air gesture. Such a multi-modal interaction paradigm enables convenient, prompt, and accurate user interaction with the AR glasses 150.

In some embodiments, both of the first and second cameras are capturing images continuously, and images captured by the first and second cameras are processed continuously to track hand gestures from two distinct perspectives. The hand gestures from the two distinct perspectives are synchronized and applied to determine a final hand gesture that optionally changes with time.

In some embodiments, one of the first and second cameras (e.g., the first camera of the HMD 150) is a primary capturing device, and the other one of the first and second cameras (e.g., the mobile device 104) is a supplemental capturing device. Hand gestures are tracked using images captured by the primary capturing device. The tracked hand gestures include joint locations that vary temporally. The tracked hand gestures are derived from the images jointly with a confidence score that indicates a level of certainty associated with determination of the hand gestures. If the confidence score is low, e.g., lower than a confidence score threshold, the electronic system 750 generates a request for an alternative hand gesture from the supplemental capturing device, and optionally forgoes using the images captured by the primary capturing device. In some situations, in response to the request, the supplemental capturing device (e.g., the second camera of the mobile device 104) initiates capturing one or more alternative images that are used to determine the alternative hand gesture. Alternatively, in some situation, the supplemental capturing device continuously captures the alternative images prior to receiving the request. In response to the request, the HMD 150 or mobile device 104 initiates determining the alternative hand gestures using the alternative images.

Stated another way, in accordance with a determination that a first confidence score associated with first hand gestures derived from first images of the first camera is below the confidence score threshold, the HMD 150 generates a request for a second hand gesture derived from one or more second images. In response to the request, the one or more second images are captured or obtained to generate the final hand gesture, and the first hand gesture is not used to generate the final hand gesture. Conversely, in some embodiments, in accordance with a determination that a second confidence score associated with second hand gestures derived from second images of the second camera is below the confidence score threshold, the mobile device 104 generates a request for a first hand gesture derived from one or more first images captured by the first camera of the HMD 150. In response to the request, the one or more first images are captured or obtained to generate the final hand gesture, and the second hand gesture is not used to generate the final hand gesture.

In some situations, when the confidence score is low for one of the first and second cameras (e.g., below a confidence score threshold) and a corresponding confidence score of hand gesture tracking on the other one of the first and second cameras is above the confidence score threshold, the electronic system 750 switches to use the other one of the first and second cameras. The one of the first and second cameras is disabled from capturing the images continuously, thereby conserving overall power consumption of the electronic system 750. Generally, in some embodiments, the electronic system 750 (e.g., the HMD 150) obtains a first confidence score associated with the first hand gesture and a second confidence score associated with the second hand gesture. The first confidence score is compared with the second confidence score. One of the first and second hand gestures having a greater confidence score is applied as the final hand gesture. Optionally, image capturing of the other one of the first and second hand gestures having a smaller confidence score is disabled to conserver power consumption.

In some embodiments, the electronic system 750 recommends a user to move the hand-held mobile device 104 to a certain location and/or orientation based on an active application and/or a status of the user's hand. For example, in a virtual keypad application, a notification is presented to suggest the user placing the mobile device 104 underneath the user's hand and capturing the second images from a bottom-up perspective of the user's hand. In some embodiments, during hand gesture tracking, the electronic system 750 also obtain a first confidence score associated with the first hand gesture, and generate a notification message suggesting that a location or orientation of the first camera of the HMD 150 be adjusted to improve the first confidence score. Alternatively or additionally, the electronic system 750 may obtain a second confidence score associated with the second hand gesture, and generate a notification message suggesting that a location or orientation of the second camera of the mobile device 104 be adjusted to improve the second confidence score.

FIGS. 8A and 8B illustrate two different perspectives 800A and 800B of an example hand gesture 800, in accordance with some embodiments, and FIGS. 9A and 9B illustrate two different perspectives 900A and 900B of another example hand gesture 900, in accordance with some embodiments. Referring to FIGS. 8A and 8B, for example, a first camera 504 (e.g., a visible light camera, an infrared light camera, or a depth sensor) is mounted at a fixed location on an HMD 150 (e.g., in-between the user's eyes), and captures a first image of the hand gesture 800 from a first perspective 800A. The first camera 504 has a limited field of view (FOV) that is limited, and a user moves his/her hand to accommodate the FOV of the first camera 504, e.g., to a certain area in front of him/her to obtain the best hand tracking performance. In some situations, the user flips the hand to capture a second image of the hand gesture 800 from a second perspective 800B, thereby allowing the first camera 504 to capture images from the perspectives 800A and 800B sequentially. In some embodiments, a second camera 506 of a client device 104 is applied to expand the FOV. The first camera 504 and second camera 506 are substantially synchronized to capture images of the hand gesture 800 from the first perspective 800A and second perspective 800B in a synchronous manner. The first and second perspectives 800A and 800B are distinct from each other. Similarly, referring to FIGS. 9A and 9B, the first camera 504 captures a first image of the hand gesture 900 from a first perspective 900A, and the second camera 506 captures a second image of the hand gesture 900 from a second perspective 900B. The first camera 504 and second camera 506 are substantially synchronized to capture images of the hand gesture 900 from the first perspective 900A and second perspective 900B that is distinct from the first perspective 900A.

The hand gesture 800 or 900 is formed and changes at a low rate, e.g., does not change within 0.5-1 second. Given such a low changing rate of the hand gesture 800 or 900, two images are captured concurrently by the first and second cameras 504 and 506 when the two images are captured within a time window having a predefined width, e.g., within 1 second. It can be assumed that these two images are captured concurrently and correspond to the same hand gesture 800 or 900.

The first perspectives of the hand gestures 800 and 900 are substantially identical, e.g. having a V-shape formed by an index finger and a middle finger of a single hand. The second perspectives of the hand gestures 800 and 900 are distinct, e.g., concerning whether remaining three fingers are open or closed. Seen from the first perspectives 800A and 900A, the hand gestures 800 and 900 are partially occluded by the hand itself, and any difference in the second perspectives 800B and 900B are not visible. As such, images captured from the second perspectives 800B and 900B provide additional information of the hand gestures, which therefore overcomes the self-occlusion issue and enhances an accuracy level of computer vision based hand tracking.

Figure 10:
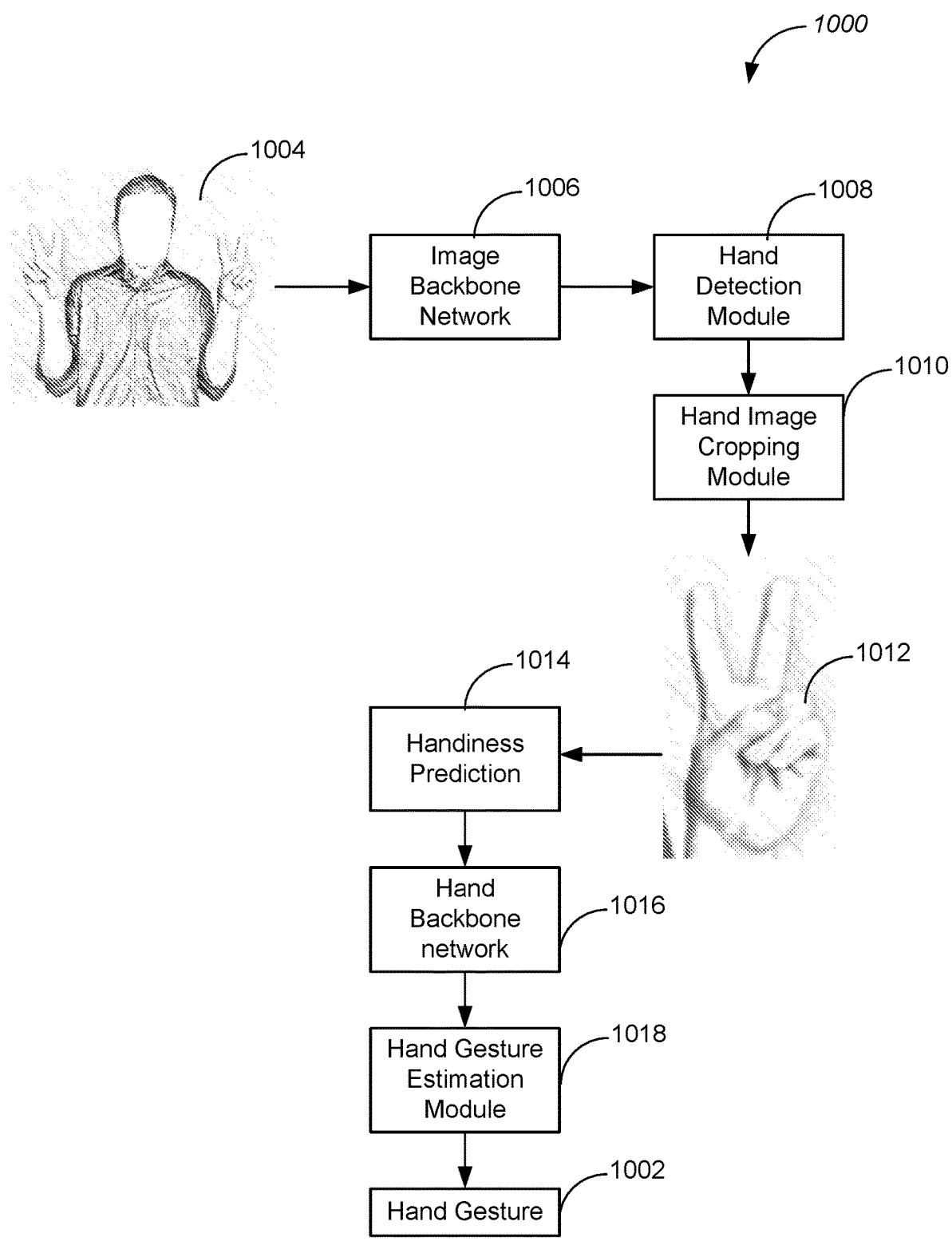
FIG. 10 is a deep learning based process of recognizing a hand gesture from an input image, in accordance with some embodiments.

FIG. 10 is a deep learning based process 1000 of recognizing a hand gesture 1002 from an input image 1004, in accordance with some embodiments. The deep learning based process 1000 is implemented locally at an electronic device that captures the input image 1004 or remotely at a distinct electronic device (e.g., a server 102 or another distinct client device 104) that receives the input image 1004. Specifically, an image backbone network 1006 is applied to identify a plurality of visual features from the input image 1004, and a hand detection module 1008 processes the plurality of visual features to determine a location of a hand in the input image, e.g., using a CNN. A hand image cropping module 1010 then crops the input image based on the location of the hand, and generates a cropped image of the hand 1012. A handiness prediction module 1014 is applied to determine whether the cropped image of the hand 1012 corresponds to a left hand or a right hand. A hand backbone network 1016 extracts a plurality of hand features from the cropped image of the hand 1012. The plurality of hand features are used by a hand gesture estimation module 1018 to determine the hand gesture 1002. In some embodiments, the hand backbone network 1016 is different for the left hand and the right hand, so is the hand gesture estimation module 1018.

The above function modules of the deep learning based process 1000 form a data processing model 240. In some embodiments, the data processing model 240 includes one or more neural networks. For example, each of the image backbone network 1006, hand detection module 1008, headiness prediction module 1014, hand backbone network 1016, and hand gesture estimation module 1018 includes a respective neural network. Optionally, each neural network is trained separately. Optionally, the data processing model 240 is trained end-to-end. In some embodiments, the data processing model 240 is trained at a server 102, and provided to individual electronic devices (e.g., the HMD 150, the mobile device 104C) for inference of the hand gesture 1002.

In some embodiments, the hand gesture 1002 includes a single static hand pose that can be determined from a single input image 1004. Alternatively, in some embodiments, the hand gesture 1002 includes an ordered sequence of hand poses captured in a duration of time, e.g., an air swipe includes a sequence of hand poses that are substantially identical and move through different locations in air. Such a hand gesture 1002 is determined from a plurality of input images 1004 that are captured within the duration of time. More specifically, in some embodiments, locations of a plurality of hand joints are identified in each input image 1004, and the hand gesture 1002 is determined from the locations of the hand joints in the single input image 1004 or movement of the locations of the hand joints in the plurality of input images 1004.

FIG. 11 is a table 1100 showing confidence scores 1102 of hand gestures 1104 identified from images captured by different cameras 1106 from different perspectives (e.g., different viewing angles), in accordance with some embodiments. The cameras 1106 are disposed in different locations of a scene where a hand is located and configured to capture the images including a hand with the different perspectives. Each camera 1106 provides a respective subset of the images (e.g., a single image, a temporal sequence of images) from which a respective hand gesture 1104 is identified in conjunction with a respective confidence score 1102. For each camera 1106, the respective confidence score 1102 indicates a level of certainty associated with determination of the respective hand gesture 1104, i.e., how certain it is that the hand can be associated with the respective hand gesture 1104 based on the respective subset of images captured by the respective camera 1106. In some embodiments, the confidence scores 1102 are normalized in a range between 0 and 1 (i.e., in [0, 1]). Specifically, in this example, the hand is determined to have a hand gesture 800 in FIGS. 8A and 8B based on one or more images captured by a camera 1106A, and the associated confidence score is 0.95. The hand is determined to have a hand gesture 900 in FIGS. 9A and 9B based on one or more images captured by a camera 1106B, and the associated confidence score is 0.85.

In some embodiments, the final hand gesture is determined from the different hand gestures 1104 associated with the different cameras 1106 according to a voting scheme in which the weight 1108 is not needed in some embodiments. Each of a subset of the hand gestures 1104 are identified to have the respective confidence score greater than a confidence score threshold (e.g., 0.5). The final hand gesture is determined as a dominating hand gesture in the subset of hand gestures, i.e., the final hand gesture repeats for a greatest number of times than any other hand gestures in the subset of hand gestures. Referring to FIG. 11, the subset of hand gestures has the confidence scores greater than 0.5 include three hand gestures associated with cameras 1106A, 1106B, and 1106C. Hand gesture 800 appears twice in the subset of hand gestures, and hand gesture 900 appears once in the subset of hand gestures. Thus, hand gesture 800 is voted as the final hand gesture of the hand that are captured from these cameras 1106.

Additionally, in some embodiments, after the subset of the hand gestures 1104 are identified to have the respective confidence scores greater than the confidence score threshold, it is determined that two hand gestures repeat for the same number of times, which is greater than that of any other hand gesture, in the subset of hand gestures. For each of the two hand gestures, an average of the confidence scores is determined for the respective hand gesture repeated in the subset of hand gestures. One of the two hand gesture having a greater confidence score average is determined as the final hand gesture of the hand that are captured from these cameras 1106. Referring to FIG. 11, the subset of hand gestures has the confidence scores greater than 0.3 include four hand gestures associated with cameras 1106A, 1106B, 1106C, and 1106D. Hand gesture 800 appears twice in the subset of hand gestures and has an average confidence score of 0.825, and hand gesture 900 appears once in the subset of hand gestures and has an average confidence score of 0.625. Thus, hand gesture 800 is voted as the final hand gesture of the hand that are captured from these cameras 1106.

In some embodiments, the final hand gesture is determined from the different hand gestures 1104 associated with the different cameras 1106 according to a weighting scheme. Each camera 1106 is assigned with a weight 1108 that accounts for an impact of quality of images captured by the respective camera 1106. For example, a camera 1106B that is closest to the hand has a greatest weight among the cameras 1106. The weights for the cameras 1106 are optionally normalized into a range of [0, 1]. A weighted sum of confidence scores is calculated for each type of hand gesture 1104 determined from images captured by the cameras 1106, and the hand gesture 1104 having the largest weighted sum of confidence scores is determined to be the final hand gesture. Referring to FIG. 11, five cameras 1106A, 1106B, 1106C, 1106D, and 1106E are used to capture images associated with hand gestures in the scene, and each camera 1106 is associated with a respective weight 1108. Two types of hand gestures (hand gesture 800 and hand gesture 900) are determined from the images captured by these five cameras. A first weighted sum of confidence scores is equal to 0.445 for the hand gesture 800, and a second weighted sum of confidence scores is equal to 0.8 for the hand gesture 900. Although the gesture 800 has been determined from images captured by three cameras, the second weighted sum of the hand gesture 900 is greater than the first weighted sum of the hand gesture 800, and the hand gesture 900 is determined as the final hand gesture.

FIG. 12 is a flow diagrams of an example method 1200 of identifying user gestures from a plurality of perspectives, in accordance with some embodiments. For convenience, the method 1200 is described as being implemented by an electronic system (e.g., a client device 104, a server 102, or a combination thereof). An example of the client device 104 is a mobile phone. The method 1200 is, optionally, governed by instructions that are stored in a non-transitory computer readable storage medium and that are executed by one or more processors of the computer system. Each of the operations shown in FIG. 12 may correspond to instructions stored in a computer memory or non-transitory computer readable storage medium (e.g., memory 206 of the system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 1200 may be combined and/or the order of some operations may be changed.

In accordance with the method 1200, the electronic system obtains (1202) one or more first images captured by a first camera (e.g., on an HMD 150). The one or more first images includes a first perspective of a hand. A first hand gesture is identified (1204) from the one or more first images. The electronic system obtains (1206) a second hand gesture. The second hand gesture is identified from one or more second images that are captured by a second camera (e.g., on a client device 104), e.g., substantially concurrently with the one or more first images. The one or more second images includes (1208) a second perspective of the hand, the second perspective (1210) distinct from the first perspective. A final hand gesture of the hand is determined (1212) based on the first and second hand gestures. The electronic system enables (1214) a predefined operation is enabled on an object according to the final hand gesture.

In some embodiments, the method 1200 is implemented at least partially or entirely by a hub device that is distinct from and communicatively coupled to a first electronic device (e.g., the HMD 150) and a second electronic device (e.g., a mobile phone 104C). The first electronic device includes the first camera and enabled to perform the predefined operation. The second electronic device includes the second camera and is distinct from the first electronic device. Alternatively, in some embodiments, the method is implemented at least partially or entirely by a hub device that is distinct from and communicatively coupled to a first electronic device (e.g., the HMD 150), a second electronic device (e.g., the mobile phone 104C), and a third electronic device (e.g., a TV device 510). The first electronic device includes the first camera (e.g., a camera 504 in FIG. 5), and the second electronic device includes the second camera (e.g., a camera 506 in FIG. 5). The third electronic device (e.g., the TV device 510) is enabled to perform the predefined operation. The first, second, and third electronic devices are distinct from each other. In these embodiments, the hub device is optionally a server 102 that is remote from the first and second electronic devices and communicatively coupled to the first and second electronic devices at least partially via a wide area network (WAN). Alternatively, in these embodiments, the hub device (e.g., a router 110 in FIG. 6) is communicatively coupled to the first and second electronic devices via a local area network (LAN).

Referring to FIG. 7A, in some embodiments, the electronic system 700 includes a first electronic device (e.g., the HMD 150) and a second electronic device (e.g., the mobile device 104). The first electronic device includes the first camera, and the second electronic device includes the second camera. A third electronic device (e.g., the TV device 510) is distinct from the first and second electronic devices and enabled to perform the predefined operation. The method is implemented at the first electronic device. Referring to FIG. 7B, in some embodiments, the electronic system 750 includes a first electronic device (e.g., the HMD 150) and a second electronic device (e.g., the mobile device 104). The first electronic device includes the first camera 504 and is enabled to perform the predefined operation. The second electronic device includes the second camera 506. The method 1200 is implemented at the first electronic device.

In some embodiments, an electronic device (e.g., a server 102, an HMD 150) obtains the second hand gesture by obtaining the one or more second images and identifying the second hand gesture from the one or more second images. Alternatively, in some embodiments, an electronic device (e.g., a server 102, an HMD 150) obtains the second hand gesture by receiving the second hand gesture from a distinct electronic device that captures the one or more second images and identifies the second hand gesture from the one or more second images.

In some embodiments, a first confidence score is obtained with the first hand gesture, and compared with a confidence score threshold. In accordance with the first confidence score is below the confidence score threshold, a request for the second hand gesture is generated. The one or more second images are captured or obtained in response to the request for the second hand gesture. Further, in some embodiments, in accordance with the first confidence score is below the confidence score threshold, the final hand gesture is generated from the second hand gesture, and not from the first hand gesture.

In some embodiments, a first confidence score is obtained with the first hand gesture, and a second confidence score is obtained with the second hand gesture. The first confidence score is compared with the second confidence score. One of the first and second hand gestures having a greater confidence score is used as the final hand gesture.

In some embodiments, a first confidence score is obtained with the first hand gesture. Based on the first confidence score, a notification message is generated to suggest that a location or orientation of the first camera be adjusted to improve the first confidence score. In some embodiments, a second confidence score is obtained with the second hand gesture. Based on the second confidence score, a notification message is generated to suggest that a location or orientation of the second camera be adjusted to improve the second confidence score.

In some embodiments, the first and second hand gestures are among a plurality of hand gestures. Each hand gesture is captured using a respective camera at a distinct perspective of the hand and associated with a respective confidence score. Each of a subset of hand gestures is identified to have the respective confidence score greater than a confidence score threshold. The final hand gesture is determined from the subset of hand gestures according to a voting scheme. Alternatively, the final hand gesture is determined from the plurality of hand gestures according to a weighting scheme in which each type of hand gesture is associated with a weighted sum of respective confidence scores of a respective subset of hand gestures. More details on the voting scheme and the weighting scheme are discussed above with reference to FIG. 10.

In some embodiments, the first hand gesture is identified from the one or more images using a deep learning model. The first hand gesture is identified by identifying locations of a plurality of hand joints from the one or more first images and determining the first hand gesture from the locations of the hand joints.

It should be understood that the particular order in which the operations in FIG. 12 have been described are merely exemplary and are not intended to indicate that the described order is the only order in which the operations could be performed. One of ordinary skill in the art would recognize various ways to prune the neural network models as described herein. Additionally, it should be noted that details of other processes described above with respect to FIGS. 5-11 are also applicable in an analogous manner to the method 1200 described above with respect to FIG. 12.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for identifying user gestures, comprising:
    obtaining one or more first images that are captured by a first camera, the one or more first images including a first perspective of a hand;
    identifying a first hand gesture from the one or more first images;
    obtaining a second hand gesture, wherein the second hand gesture is identified from one or more second images that are captured by a second camera, the one or more second images including a second perspective of the hand, the second perspective distinct from the first perspective;
    determining a final hand gesture of the hand based on the first and second hand gestures; and
    enabling a predefined operation on an object according to the final hand gesture;
    wherein determining the final hand gesture further comprising:
    obtaining a first confidence score associated with the first hand gesture; obtaining a second confidence score associated with the second hand gesture; comparing the first confidence score with the second confidence score; and
    using one of the first and second hand gestures having a greater confidence score as the final hand gesture.

2. The method of claim 1, wherein the method is implemented at least partially by a hub device that is distinct from and communicatively coupled to a first electronic device and a second electronic device, the first electronic device including the first camera and enabled to perform the predefined operation, the second electronic device including the second camera and distinct from the first electronic device.

3. The method of claim 1, wherein the method is implemented at least partially by a hub device that is distinct from and communicatively coupled to a first electronic device, a second electronic device, and a third electronic device, the first electronic device including the first camera, the second electronic device including the second camera, the third electronic device enabled to perform the predefined operation, the first, second, and third electronic devices being distinct from each other.

4. The method of claim 2, wherein the hub device is a server that is remote from the first and second electronic devices and communicatively coupled to the first and second electronic devices at least partially via a wide area network (WAN).

5. The method of claim 2, wherein the hub device is communicatively coupled to the first and second electronic devices via a local area network (LAN).

6. The method of claim 1, wherein:
    an electronic system includes a first electronic device and a second electronic device, the first electronic device including the first camera and enabled to perform the predefined operation, the second electronic device including the second camera; and
    the method is implemented at the first electronic device.

7. The method of claim 1, wherein:
    an electronic system includes a first electronic device and a second electronic device, the first electronic device including the first camera, the second electronic device including the second camera, and a third electronic device distinct from the first and second electronic devices and enabled to perform the predefined operation; and
    the method is implemented at the first electronic device.

8. The method of claim 1, obtaining the second hand gesture further comprising:
    obtaining the one or more second images; and
    identifying the second hand gesture from the one or more second images.

9. The method of claim 1, obtaining the second hand gesture further comprising:
    receiving the second hand gesture from a distinct electronic device that captures the one or more second images and identifies the second hand gesture from the one or more second images.

10. The method of claim 1, determining the final hand gesture further comprising:
    obtaining a first confidence score associated with the first hand gesture; comparing the first confidence score with a confidence score threshold; and in accordance with the first confidence score is below the confidence score threshold, generating a request for the second hand gesture, wherein the one or more second images are captured or obtained in response to the request for the second hand gesture.

11. The method of claim 10, determining the final hand gesture further comprising:
in accordance with the first confidence score is below the confidence score threshold, generating the final hand gesture from the second hand gesture and forgoing using the first hand gesture to generate the final hand gesture.

12. The method of claim 1, further comprising:
obtaining the first confidence score associated with the first hand gesture; and
based on the first confidence score, generating a notification message suggesting that a location or orientation of the first camera be adjusted to improve the first confidence score.

13. The method of claim 1, wherein,
the first and second hand gestures are among a plurality of hand gestures, and each hand gesture is captured using a respective camera at a distinct perspective of the hand and associated with a respective confidence score;
each of a subset of hand gestures is identified to have the respective confidence score greater than a confidence score threshold; and
the final hand gesture is determined from the subset of hand gestures according to a voting scheme.

14. The method of claim 1, wherein,
the first and second hand gestures are among a plurality of hand gestures, and each hand gesture is captured using a respective camera at a distinct perspective of the hand and associated with a respective confidence score; and
the final hand gesture is determined from the plurality of hand gestures according to a weighting scheme in which each type of hand gesture is associated with a weighted sum of respective confidence scores of a respective subset of hand gestures.

15. The method of claim 1, wherein the first hand gesture is identified from the one or more images using a deep learning model, and identifying the first hand gesture further comprises:
identifying locations of a plurality of hand joints from the one or more first images; and
determining the first hand gesture from the locations of the hand joints.

16. The method of claim 1, wherein the predefined operation associated with the final hand gesture is one of launching a first user application, exiting a second user application, and dismissing a message.

17. The method of claim 1, wherein the final hand gesture is one of a swipe, a tap, and an in-air scribble for text input.

18. An electronic system, comprising:
one or more processors; and
memory having instructions stored thereon, which when executed by the one or more processors cause the processors to perform:
obtaining one or more first images that are captured by a first camera, the one or more first images including a first perspective of a hand;
identifying a first hand gesture from the one or more first images;
obtaining a second hand gesture, wherein the second hand gesture is identified from one or more second images that are captured by a second camera, the one or more second images including a second perspective of the hand, the second perspective distinct from the first perspective;
determining a final hand gesture of the hand based on the first and second hand gestures; and
enabling a predefined operation on an object according to the final hand gesture;
wherein determining the final hand gesture further comprising:
obtaining a first confidence score associated with the first hand gesture; obtaining a second confidence score associated with the second hand gesture; comparing the first confidence score with the second confidence score; and
using one of the first and second hand gestures having a greater confidence score as the final hand gesture.

19. A non-transitory computer-readable medium, having instructions stored thereon, which when executed by one or more processors cause the processors to perform:
obtaining one or more first images that are captured by a first camera, the one or more first images including a first perspective of a hand;
identifying a first hand gesture from the one or more first images;
obtaining a second hand gesture, wherein the second hand gesture is identified from one or more second images that are captured by a second camera, the one or more second images including a second perspective of the hand, the second perspective distinct from the first perspective;
determining a final hand gesture of the hand based on the first and second hand gestures; and
enabling a predefined operation on an object according to the final hand gesture;
wherein determining the final hand gesture further comprising:
obtaining a first confidence score associated with the first hand gesture; obtaining a second confidence score associated with the second hand gesture; comparing the first confidence score with the second confidence score; and
using one of the first and second hand gestures having a greater confidence score as the final hand gesture.

* * * * *